(12) United States Patent
Grove et al.

(10) Patent No.: US 7,861,719 B1
(45) Date of Patent: Jan. 4, 2011

(54) HIGH SURFACE AREA CHEMICAL/BIOLOGICAL AIR-PURIFYING FILTER

(75) Inventors: Corey M. Grove, Red Lion, PA (US); Stephen E. Chase, Jarrettsville, MD (US); Daniel J. Barker, Fawn Grove, PA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 1053 days.

(21) Appl. No.: 11/533,060

(22) Filed: Sep. 19, 2006

(51) Int. Cl.
*A61M 11/00* (2006.01)
(52) U.S. Cl. .............................. 128/205.29; 128/206.17
(58) Field of Classification Search ............ 128/205.27, 128/205.29, 206.13, 206.17
See application file for complete search history.

(56) References Cited

U.S. PATENT DOCUMENTS

| | | | | |
|---|---|---|---|---|
| 5,651,810 | A | * | 7/1997 | Flaherty et al. ................ 95/287 |
| 5,800,587 | A | * | 9/1998 | Kahlbaugh et al. ............ 55/486 |
| 6,763,835 | B1 | * | 7/2004 | Grove et al. ................. 128/857 |
| 7,028,688 | B1 | * | 4/2006 | Grove et al. ............ 128/201.25 |
| 2005/0109337 | A1 | * | 5/2005 | Diaz et al. ............. 128/201.22 |

* cited by examiner

*Primary Examiner*—Steven O Douglas
(74) *Attorney, Agent, or Firm*—Ulysses John Biffoni

(57) ABSTRACT

Airflow is improved for multi-agent chemical biological air-purifying apparatus by providing a filter module that has multiple filter elements contained within a substantially sealed housing. The housing secures the filter elements in a spaced relation such that the top and bottom faces of each filter element are exposed to the flow of air and provides an air path within the housing adapted to channel air through the multiple filter elements in a parallel flow. The filter module may be made from a flexible and resilient plastic material and may be contoured to conform to the shape of a helmet liner or similar headgear.

17 Claims, 5 Drawing Sheets

HIGH SURFACE AREA CHEMICAL/BIOLOGICAL AIR-PURIFYING FILTER

GOVERNMENT INTEREST

The invention described herein may be manufactured, licensed, and used by or for the U.S. Government.

TECHNICAL FIELD

The present invention relates in general to air-purifying filters, and more particularly to replaceable filter modules especially suited for use in breathing apparatus designed to provide protection against a range of toxic airborne contaminants including chemical and biological agents, and the like.

BACKGROUND

Chemical Biological air-purifying filtration devices such as those currently used by U.S. joint force and homeland security personnel employ multiple layers of filter media to provide protection against a wide range of aerosol and chemical threat agents. One or more layers typically contain a fibrous medium that traps particulate threats of biological origin (e.g., bacteria, viruses, and toxins) and other harmful aerosols by inertial impaction, diffusion, and/or electrostatic attraction. Another layer typically contains a sorbent material such as a bed of activated carbon to capture gaseous toxic vapors by physical adsorption. To remove high volatility toxic vapors that are not retained on activated carbon by physical adsorption the adsorbent layer is often impregnated with a reactive chemical that breaks down the vapor into more benign chemical compounds that can be adsorbed.

One significant challenge in designing a Chemical Biological air-purifying filtration device is to provide protection against a wide range of contaminants for a reasonable period of time without imposing a burdensome breathing resistance on the user and without adding to filter bulkiness, weight, or air-purifying system complexity. For example, filter cartridges used in the M50 dual cartridge Chemical Biological respirator, widely deployed by U.S. joint forces, are about 2.5 cm in depth and provide a combined filter surface area of 125 $cm^2$. Carbon adsorbent beds in the filter cartridges are about 10 to 15 mm deep. A relatively deep carbon bed depth is needed to avoid early breakthrough of toxic vapors that are injected at relatively high linear velocity in filters of this surface area. Aerosol filter media also needs to be about 10 to 15 mm deep to trap smaller particles of concern. While the twin filter design of the M50 is highly effective and represents a significant improvement over previous designs, breathing resistance provided by twin filter masks such as the M50 can cause premature fatigue and user discomfort, especially in operations where users are under significant physical or mental stress.

Incorporating larger filters in conventional chemical biological respirator masks intended for use by military and law enforcement personnel has been especially difficult. These difficulties include obstructing the wearer's field of vision, adding weight and bulk to already burdensome headgear and restricting movement of the head. For the reasons stated above and for additional reasons stated hereinafter, which will become apparent to those skilled in the art upon reading and understanding the present specification, there is a need for an improved Chemical Biological air-purifying filter that provides reduced breathing resistance without increasing the overall size of a filter cartridge or module.

SUMMARY

In general, in one aspect, an embodiment of a filter module for use in an air-purifying apparatus includes a plurality of filter elements each comprising top and bottom faces through which air may pass and a sealed peripheral edge that is substantially air tight, a sealed housing that encloses and secures the plurality of filter elements in a substantially parallel spaced relation such that the top and bottom faces of each filter element are exposed to the flow of air, an air path within the housing adapted to channel air through the multiple filter elements in a parallel flow, a first air opening in the housing in fluid communication with the air path to provide air to the filter elements, and a second air opening in the housing in fluid communication with the air path to outlet filtered air from the filter module.

In yet another aspect, a method for increasing the surface area of a filter module for use in a chemical-biological air purifying apparatus includes providing a plurality of multi-layered air purifying filter elements, orienting the plurality of multi-layered air purifying filter elements in a substantially parallel spaced relation, enclosing the filter elements within a substantially sealed housing having an air inlet and an air outlet, and providing an air path within the housing adapted to channel air through the plurality of multi-layered air purifying filter elements in a parallel airflow.

DETAILED DESCRIPTION

In the following detailed description, reference is made to the accompanying drawings. The drawings illustrate specific embodiments in which the invention, as claimed, may be practiced. This invention may, however, be embodied in many different forms and should not be construed as limited to the embodiments set forth; rather, these embodiments are provided so that this disclosure will be thorough and complete, and will fully convey the scope of the invention to those skilled in the art. As will be appreciated by those of skill in the art, the present invention may be embodied in methods, systems and devices. Wherever possible, the same reference numbers will be used throughout the drawings to refer to the same or like parts.

Figure 1:
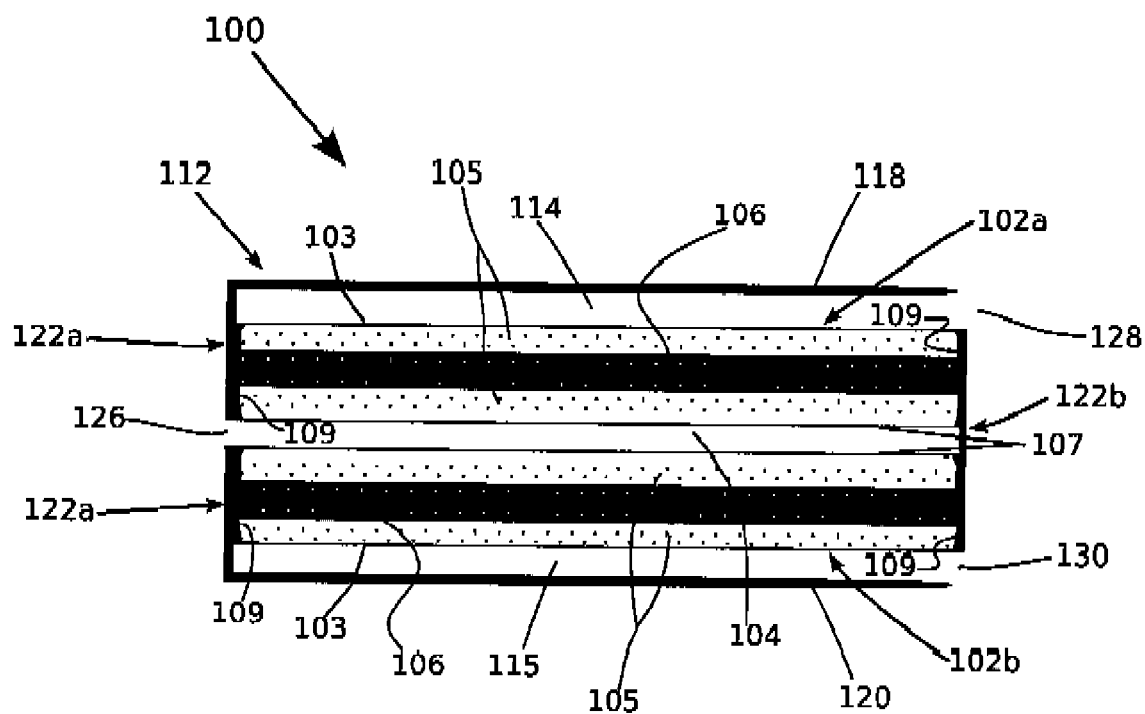
FIG. 1 shows a side sectional schematic of a preferred embodiment of a Chemical Biological filter module according to the present invention.

FIG. 1 shows a side sectional schematic of a preferred embodiment of a high surface area chemical/biological air-purifying filter module 100 according to the present invention. Filter module 100 provides a stack of two substantially identical filter elements 102a and 102b enclosed within a common modular housing 112. In this embodiment, two filter elements are shown. In alternative embodiments, more than two filter elements may be provided. Housing 112 has a top wall 118, a bottom wall 120, opposing sidewalls 122a and 122b and opposing front and back endwalls (not shown in this view).

Each filter element 102 has a top face 103 and a bottom face 107 through which air can pass, and a peripheral edge 109 that is sealed so that it is substantially air tight. Sealing of peripheral edges 109 can be accomplished with a silicone, polyurethane or a thermoplastic edge sealant, or a similar material. The peripheral edges 109 of each filter element 102 are in sealing contact with the sidewalls 122a and 122b of housing 112 and are secured inside a sealed housing 112 in a parallel spaced relation such that the top face 103 and bottom face 107 of each filter element 102 are exposed to the flow of air. The same material used to seal peripheral edges 109 may also be used to secure the filter elements 102 into housing 112.

Figure 2:
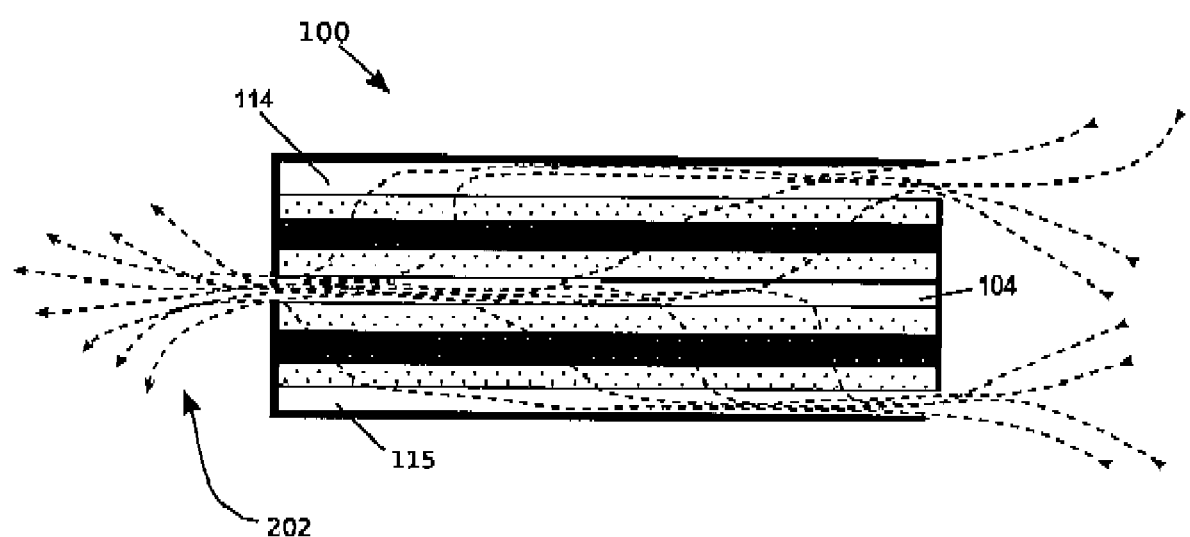
FIG. 2 shows the schematic of FIG. 1 with arrows indicating the direction of flow of a first representative airflow pattern.
Figure 3:
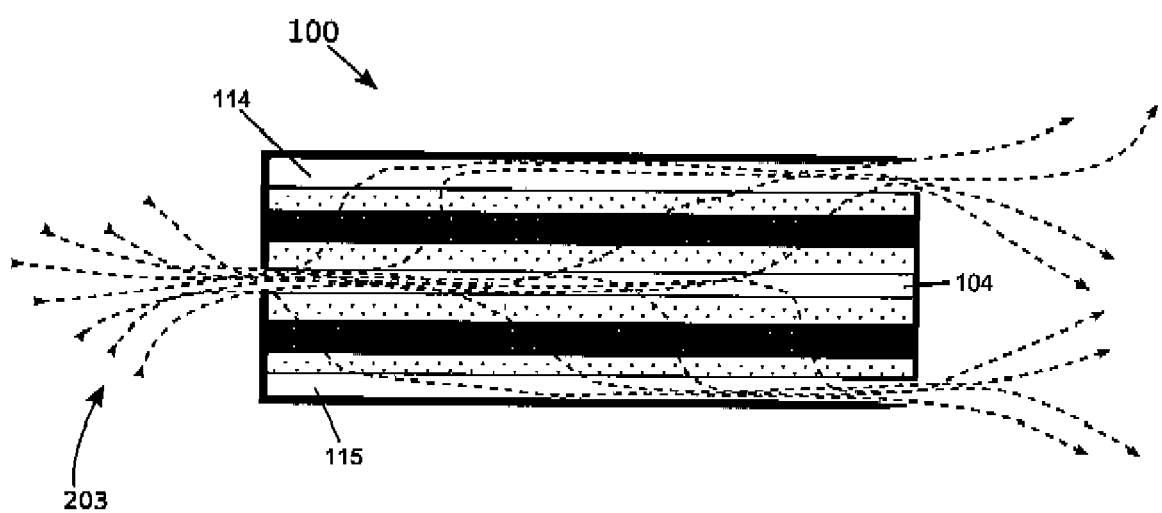
FIG. 3 shows the schematic of FIG. 1 with arrows indicating the direction of flow of a second representative airflow pattern.

As shown in FIGS. 2 and 3, air paths 202 and 203 are provided within housing 112 so that air passes through the multiple filter elements in a parallel flow. The air path traverses at least one inner passage 104 in the space between the adjacent filter elements. For N filter elements 102 enclosed within housing 112, N−1 inner passages 104 are thus provided. Air path 202 also traverses outer passages in the spaces above and below the outermost filter elements. The outer passages include an upper air passage 114 provided above the top face 103 of the top filter element 102a and a lower air passage 115 provided under the top face 103 of the bottom filter element 102b. Air passages 104, 114, and 115 are dimensioned to expose substantially the entire surface areas of top and bottom faces 103 and 107 to enable air to flow freely over and through each filter element 102 enclosed within housing 112.

Three air openings 126, 128, and 130 are provided through sidewalls 122 of housing 112 to allow air to flow through filter module 100. A first air opening 126, which may function as an inlet or an outlet, communicates the flow of air to or from inner air passage 104. Air openings 128 and 130 communicate the flow of air to or from top and bottom outer air passages 114 and 115, respectively. In general, passages 104, 114, and 115, and air openings 126, 128, and 130 are dimensioned to minimize air resistance. In this embodiment, air openings 126, 128, and 130 are slot-shaped apertures that extend substantially across the horizontal length of the sidewalls 122.

Housing 112 is preferably made from a flexible chemically resistant plastic material such as silicone, epoxy, polyurethane, thermoplastic, or similar material and may be formed by pouring or injecting a liquid sealer such as silicone, epoxy, polyurethane, thermoplastic, or the like into a mold around filter elements 102. Alternatively, housing 112 may be molded in a separate process operation and the filter elements 102 sealed and secured therein with a suitable gasket material. As described more particularly below, embodiments of modular filters according to the present invention may be shaped and contoured to conform to the inside of a helmet, hood, or mask such as a cavity in the headgear lining above or behind the head of the wearer.

Each Filter element 102 is made up of multiple layers of filter media including at least one sorbent filter layer 106. In the preferred embodiment, sorbent layer 106 is sandwiched between top and bottom layers of aerosol filter layers 105 which enables the airflow through filter elements 102 to be reversed. In alternative embodiments, non-reversible filter elements may be employed to reduce filter module thickness.

The use of identical filter elements is preferred to ensure that airflow impedance through each parallel filter element is substantially equivalent.

Sorbent filter layer 106 preferably includes a bed of activated carbon to capture gaseous toxic vapors by physical adsorption. The increased surface area provided by the parallel flow of embodiments according to the present invention generally will enable the use of finer granules of carbon and correspondingly will provide better vapor filtration compared to traditional carbon media. The use of carbon composite media also facilitates development and fabrication of contoured filter modules since the thin layers can be more easily contoured. The carbon media preferred for use in the one or more sorbent layers 106 is a carbon composite media such as KX Industries PLEKX composite media. Carbon loading is accomplished using ground Calgon ASZM-TEDA carbon. This media offers excellent vapor filtration and low airflow resistance characteristics. The media can be loaded to at least 1000 grams/m2 of carbon and layered (~2.5 mm. per layer @ 1000 g/m2) to provide chemical protection that meets the needs of most applications. Carbon mesh sizes may also be varied to optimize filter capacity and/or to reduce breathing resistance. Reactants such as metal salts and other specially formulated compounds to neutralize or remove a variety of CWAs and other toxic vapors and gases may also be impregnated in sorbent layers 106 or may be provided in a separate layer.

The particulate/aerosol media preferred for use in particulate media layers 105 is an electrostatic particulate filter media such as the 3M Advanced Electret Media. The 3M Advanced Electret Media offers excellent aerosol filtration and very low airflow resistance characteristics and can be layered as needed (~1.0 mm per layer) to achieve HEPA performance. Aerosol filter layers 105 may also be pleated to increase surface area. Additionally, one or more layers may be impregnated with a reactive chemical that breaks down the vapor into more benign chemical compounds that can be adsorbed.

A stack of two filter elements 102 each having a filter surface area of 125 cm$^2$ provides a filter surface area of 250 cm$^2$ in an embodiment of a filter module according to the present invention. Overall filter depth for a single carbon layer stacked filter assembly is approximately 15 mm for a two-layer assembly, and 25 mm for a three layer assembly, etc. As noted, additional layered filter elements 102 can be incorporated to achieve filter modules having even greater surface areas.

In operation, two flow direction alternatives are possible for the same filter module. FIG. 2 shows a first airflow pattern 202 in which input air is received by filter module 100 at air openings 128 and 130 and filtered output air is provided at air opening 126. FIG. 3 shows an alternative airflow pattern 203 in which input air is received by filter module 100 at air opening 126 and filtered output air is provided at air openings 128 and 130. Determining which airflow alternative to use in a particular embodiment will depend on the configuration and design of the headgear that incorporates filter module 100.

Figure 4:
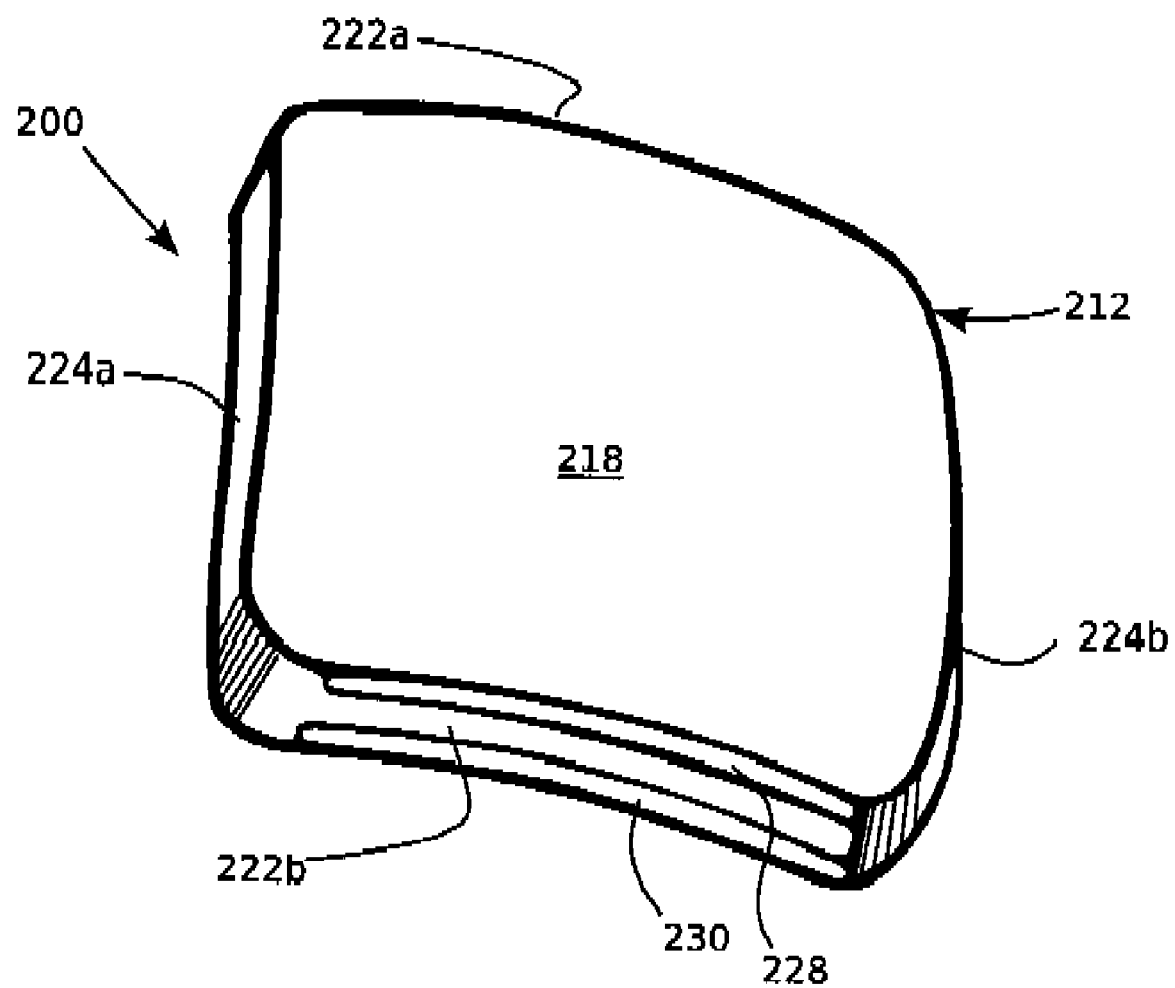
FIG. 4 shows a perspective view of a preferred embodiment of a Chemical
Biological filter module according to the present invention.
Figure 5:
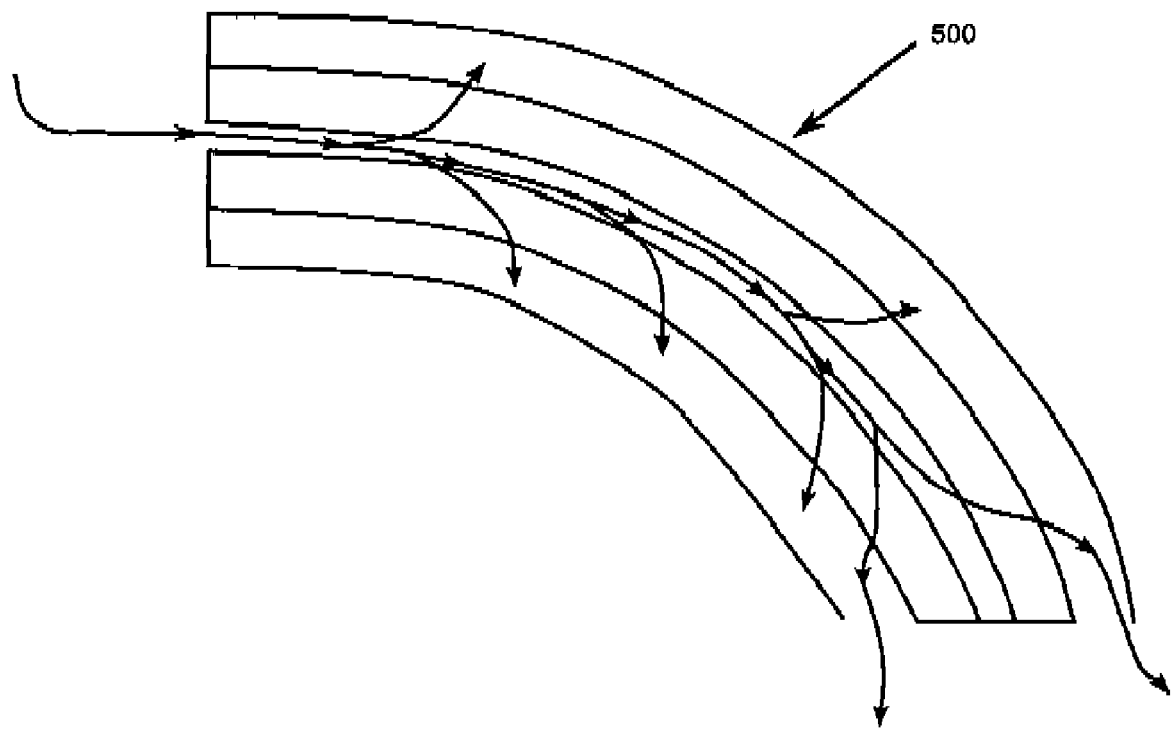
FIG. 5 shows a side sectional schematic of an embodiment of a Chemical Biological filter module according to the present invention that has been contoured for incorporation in headgear such as a helmet.

Filter modules in embodiments according to the present invention may vary in shape and size to meet the needs of a particular application. For example, the overall shape of such filter modules may be round, oval, or rectangular and may be flat or contoured to conform to the shape of an area such as the inside of a helmet or face mask. As shown in FIGS. 4 and 5, embodiments of filter modules according to the present invention may be contoured to conform to the shape of the head and to fit within a cavity provided inside of a helmet liner or other headgear. FIG. 4 shows a perspective view of a filter module 200 according to the present invention that has been shaped and sized to fit into a cavity in the lining of a helmet. In this example, housing 212 of filter module is substantially concave on the bottom surface (not shown) and convex on the top surface 218. FIG. 5 shows a schematic cross-section of an alternative and somewhat larger filter module 500 that has been contoured to conform to the crown of a person's head.

Filter module 200 is designed according to the schematic shown in FIG. 1 and thus includes two multi-layered filter elements 102a and 102b secured in a housing 212 in spaced relation so as to form an inner air passage 104 between the filter elements and top and bottom air passages 114 and 115. Housing 212 is formed of opposing sidewalls 222a and 222b and opposing endwalls 224a and 224b, a top wall 218 and a bottom wall opposite the top wall (not shown). Elongate slotted air openings 228 and 230 open through opposite sidewall 222b into the top and bottom air passages 114 and 115. A similar elongate slotted air opening (not shown) through sidewall 222a allows air to pass into inner passage 104. The housings of filter modules designed to be incorporated into headgear are preferably made from a flexible, resilient, chemically resistant plastic material such as silicone, epoxy, polyurethane, thermoplastic, or the like. Housings may be formed by pouring or injecting a liquid sealer such as silicone, epoxy, polyurethane, thermoplastic, or the like into a mold around filter elements 102. Alternatively, the housing may be formed in one or more separate process operations. Overall, filter modules designed to be incorporated into helmet liners and similar headgear such as filter module 200 should be flexible and resilient to be comfortable for the wearer and to provide reasonably good shock absorbing capabilities. At the same time, the housing should be sufficiently rigid to avoid constriction of air passages and/or compression of filter media that could interfere with filter performance. Ribbing or other spacer elements may be provided to ensure that internal air passages will remain open.

A number of airflow and chemical tests were performed on prototype filters made according to the present invention. Key test parameters are shown in Table 1, below. Three (3) layers of carbon media were used in the prototypes to create approximately 3000 g/m² of carbon loading. Two aerosol layers were included for each filter element. Performance testing assumed effective filter surface areas of 250 cm² and 500 cm² which represented two concept filter assemblies. Performance testing results are shown in Tables 2 and 3, below. These results demonstrate the potential for significantly reduced breathing resistance in embodiments according to the present invention. Use of smaller mesh carbon (30×70), provides for both improved gas life and reduced breathing resistance. Overall filter depth of the cartridge assembly is 25 mm.

The high surface area capacity provided by embodiments according to the present invention may enable the number of carbon composite layers to be reduced from three layers in some applications. For example, a single carbon composite layer 106 sandwiched between top and bottom aerosol layers 105 reduces the overall filter depth to about 15 mm. Such reduced thickness will enable filter modules to be positioned in additional locations. Performance levels can be maintained or improved while airflow resistance continues to be reduced. Table 3 contains performance estimates for the head mounted filter concept.

TABLE 1

Key Parameters used in Performance Testing

| Test | Key Parameters |
|---|---|
| Gas Life Flow Rate | 50 liters per minute |
| DMMP Gas Life | 3000 mg/m³ challenge concentration |
| CK Gas Life | 4000 mg/m³ challenge concentration |
| Airflow Resistance | 85 liters per minute |

TABLE 2

Summary of Carbon Composite Filter Media Performance Testing

| Carbon Media | Airflow Resistance (mm of H2O) | DMMP Gas Life (minutes) | CK Gas Life (minutes) |
|---|---|---|---|
| Cartridge Assembly, 3 layers (20 × 50) | 7.2 | 84 | 12 |
| Cartridge Assembly, 3 layers (30 × 70) | 13.6 | 142 | 21 |
| Packed Bed Filter* | 30-40 | 80-100 | 10-15 |

*Estimates for an equivalent size 125 cm² packed bed (20 × 50 mesh) filter.

TABLE 3

Performance Estimates for Head Mounted Filter Concept

| Carbon Media | Airflow Resistance (mm of H2O) | DMMP Gas Life (minutes) | CK Gas Life (minutes) |
|---|---|---|---|
| Head Mounted Filter, 1 layer (20 × 50) | 2-4 | 80-100 | 10-15 |
| Head Mounted Filter, 1 layer (30 × 70) | 4-8 | 140-160 | 20-25 |
| Packed Bed Filter* | 30-40 | 80-100 | 10-15 |

*Estimates for an equivalent size 125 cm² packed bed (20 × 50 mesh) filter.

CONCLUSION

As has been shown, embodiments according to the present invention provide a compact filter module for use in air-purifying apparatus such as respirator masks that includes multiple filter elements enclosed in a common housing. The module provides air openings to air passages within the housing that expose both surfaces of each filter element to the free flow of air and channel air through the multiple filter elements in parallel, effectively multiplying the surface area of the filter by the number of filter elements in the housing. The housing is preferably made from a flexible plastic material that can be formed in a variety of different shapes so that filter modules can conform to the shape of the head and be incorporated into the lining or other internal structure of a respirator mask or helmet.

Embodiments of filter modules according to the present invention provide reduced breathing resistance in comparison to comparably sized conventional air-purifying filters and may be used in a variety of systems to remove vapors and airborne particulates including Chemical Warfare Agents (CWAs), Biological Warfare Agents, Toxic Industrial Chemicals (TICs) and the like. Additional anticipated benefits include reduced manufacturing costs and extended filter life.

A number of embodiments of the invention defined by the following claims have been described. Nevertheless, it will be understood that various modifications to the described embodiments may be made without departing from the spirit and scope of the claimed invention. Accordingly, other embodiments are within the scope of the invention, which is limited only by the following claims.

What is claimed is:

1. A filter module for use in an air-purifying apparatus, comprising:
    a plurality of filter elements each comprising top and bottom faces through which air may pass and a sealed peripheral edge that is substantially air tight;
    a sealed housing that encloses and secures the plurality of filter elements in a substantially parallel spaced relation such that the top and bottom faces of each filter element are exposed to the flow of air;
    an air path within the housing adapted to channel air through the multiple filter elements in a parallel flow;
    a first air opening in the housing in fluid communication with the air path to provide air to the filter elements;
    a second air opening in the housing in fluid communication with the air path to outlet filtered air from the filter module; and
    wherein the housing conforms generally to the contour of headgear.

2. The filter module of claim 1, wherein the plurality of filter elements each comprise a layer of sorbent filter media sandwiched between layers of particulate filter media.

3. The filter module of claim 2, wherein peripheral edges of the filter elements are in sealing contact with the housing.

4. The filter module of claim 1, wherein the air path comprises an inner air passage between adjacent filter elements, an upper air passage above the plurality of filter elements, and a lower air passage below the plurality of filter elements.

5. The filter module of claim 1, wherein the filter elements each comprise multiple layers of filter media.

6. The filter module of claim 5, wherein the filter elements each comprise a layer of sorbent filter media between layers of particulate filter media.

7. The filter module of claim 6, wherein the sorbent filter media comprises multiple layers.

8. The filter module of claim 6, wherein the sorbent filter media comprises a carbon composite.

9. The filter module of claim 1, wherein the housing comprises a flexible and resilient plastic material.

10. The filter module of claim 1, wherein the headgear comprises a helmet liner.

11. The filter module of claim 1, wherein the plurality of filter elements are configured to permit the flow of air through the filter module to be reversed.

12. The filter module of claim 1, wherein the air-purifying apparatus comprises a chemical-biological personal breathing device.

13. A filter module for a chemical-biological air-purifying apparatus, comprising:
    a plurality of multi-layered filter elements each comprising top and bottom faces through which air may pass and a sealed peripheral edge that is substantially air tight;
    a substantially sealed housing that encloses the plurality of multi-layered filter elements and secures the filter elements in a parallel spaced relation such that the top and bottom faces of each filter element are exposed to the flow of air and such that peripheral edges of the filter elements are in sealing contact with the housing;
    an air path within the housing adapted to channel air through the plurality of multi-layered filter elements in a parallel flow, wherein the air path comprises an inner air passage between adjacent multi-layered filter elements, an upper air passage above the plurality of multi-layered filter elements, and a lower air passage below the plurality of multi-layered filter elements;
    a first air opening in the housing in fluid communication with the inner air passage;
    a second air opening in the housing in fluid communication with the upper air passage; and
    a third air opening in the housing in fluid communication with the lower air passage.

14. The filter module of claim 13, wherein the plurality of filter elements comprise a layer of sorbent filter media sandwiched between layers of particulate filter media.

15. The filter module of claim 13, wherein the filter module is contoured to the shape of a person's head.

16. The filter module of claim 13, wherein the filter module housing comprises a flexible and resilient plastic material.

17. The filter module of claim 14, wherein the layer of sorbent filter media comprises a carbon composite.

* * * * *